US012774953B2

(12) United States Patent
Salo

(10) Patent No.: US 12,774,953 B2
(45) Date of Patent: Oct. 27, 2026

(54) REFRACTOMETER

(71) Applicant: KXS TECHNOLOGIES OY, Espoo (FI)

(72) Inventor: Harri Salo, Vantaa (FI)

(73) Assignee: KXS TECHNOLOGIES OY, Espoo (FI)

( * ) Notice: Subject to any disclaimer, the term of this patent is extended or adjusted under 35 U.S.C. 154(b) by 256 days.

(21) Appl. No.: 18/259,661

(22) PCT Filed: Dec. 27, 2021

(86) PCT No.: PCT/FI2021/050914
§ 371 (c)(1),
(2) Date: Jun. 28, 2023

(87) PCT Pub. No.: WO2022/144503
PCT Pub. Date: Jul. 7, 2022

(65) Prior Publication Data

US 2024/0068940 A1 Feb. 29, 2024

(30) Foreign Application Priority Data

Dec. 28, 2020 (FI) ..................................... 20206374

(51) Int. Cl.
*G01N 21/41* (2006.01)
*G01N 21/85* (2006.01)

(52) U.S. Cl.
CPC ......... *G01N 21/4133* (2013.01); *G01N 21/85* (2013.01); *G01N 2201/0634* (2013.01)

(58) Field of Classification Search
None
See application file for complete search history.

(56) References Cited

U.S. PATENT DOCUMENTS

| | | | | |
|---|---|---|---|---|
| 5,153,666 A * | 10/1992 | Pawliszyn | G01N 21/4133 | 356/128 |
| 6,067,151 A | 5/2000 | Salo | | |
| 6,130,439 A | 10/2000 | Le | | |
| 2002/0018200 A1* | 2/2002 | Salo | G01N 21/431 | 356/128 |
| 2008/0297792 A1* | 12/2008 | Kim | G01J 3/4406 | 356/317 |
| 2009/0122300 A1* | 5/2009 | Wu | G01N 21/4133 | 356/128 |
| 2011/0075141 A1 | 3/2011 | Salo | | |
| 2011/0194109 A1 | 8/2011 | Kaahre | | |
| 2013/0239678 A1* | 9/2013 | Salo | G01D 11/245 | 73/431 |
| 2025/0180484 A1* | 6/2025 | Eyal | G01N 21/6458 | |

OTHER PUBLICATIONS

International Search Report for PCT/FI2021/050914 mailed Apr. 1, 2022, 5 pages.
Written Opinion of the ISA for PCT/FI2021/050914, mailed Apr. 1, 2022, 9 pages.

* cited by examiner

*Primary Examiner* — Kara E. Geisel
*Assistant Examiner* — Chad Andrew Reverman
(74) *Attorney, Agent, or Firm* — NIXON & VANDERHYE

(57) ABSTRACT

The present disclosure concerns a refractometer including a measurement window inside a flow channel of the flow vessel of the refractometer, the flow channel being designed to allow process fluid flow at least at the measurement window in laminar flow regime of the dedicated process liquid.

20 Claims, 2 Drawing Sheets

(Known techniques)

REFRACTOMETER

This application is the U.S. national phase of International Application No. PCT/FI2021/050914 filed Dec. 27, 2021, which designated the U.S. and claims priority to FI patent application No. 20206374 filed Dec. 28, 2020, the entire contents of each of which are hereby incorporated by reference.

FIELD OF THE INVENTION

Generally, the present invention relates to process monitoring devising. In particular, the present disclosure of embodiments of the invention pertains to process monitoring as based on optical measurements. Further specifically, the present disclosure pertains to refractometer as disclosed in the preamble part of an independent claim directed to a refractometer and a system using the same.

BACKGROUND

Figure 1:
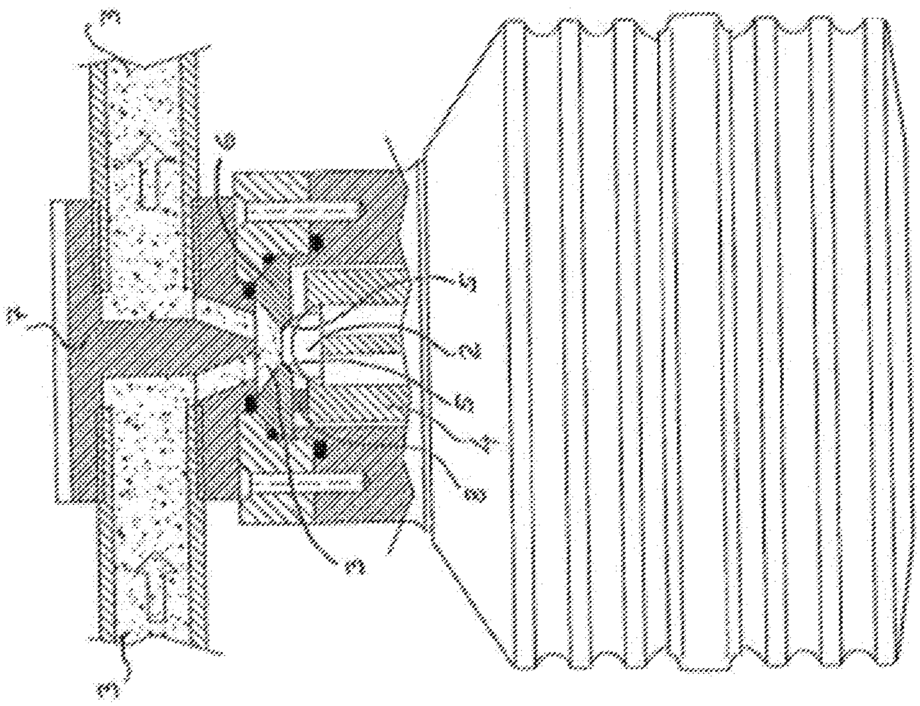

In the field, there is a known refractometer structure to be used in a refractometer, shown with reference to FIG. 1. The structure in such a refractometer comprises an optical module (4) arranged floatingly inside a housing structure, which module comprises an optical window (2) to be positioned in a process fluid (3), and means for forming an illuminating beam and for directing it into the process fluid (3) through the optical window (2) and for directing back the part of the illuminating beam that is reflected from the process fluid, and further, means for watching the image formed in said manner. In such a refractometer the optical module (4) is arranged to be supported against the housing structure by means of sealing (5) arranged between the optical window (2) and the housing structure. This is because of the purpose to provide a device which is suitable for difficult conditions, the housing structure part (6) in contact with the process fluid (3) against which the optical window (2), being arranged to be supported via the sealing (5) being formed of a material that is chemically durable, mechanically rigid and durable and has good thermal conductivity.

However, the structure has a complicated flow arrangement as the measurement window for the optical measurement is outside the process tube. The re-directions in turns of the tube and the flow inside along the tube influence on the flow, for example to the boundary layers to be disturbed, and/or vorticity of the flow. These may induce chemical reactions in the flow, and in its worst case with nucleation sensitive materials near the conditions of full saturation of solved materials in the medium could lead to colloidal material formation in size range of nano materials. Floating structure as such is also complicated but needs to be made tight by using large forces because in such a structure the sealing is often made by Teflon sealing between the prism and a sapphire disk (6). In addition, at the presence of the large forces, especially if hit, the sapphire disk is sensitive to break apart, but is also expensive and difficult to manufacture.

The thermal contact in such a structure can be insufficient for rapid measurements. This is because there can be only one side as a contact to the process liquid, and the wall between the process liquid and thermometer being thick, which consequently can cause slow responding time to the temperature changes, as the thermometer (8) is in contact with the sapphire disk.

However, the optical refractometer-based measurement needs a temperature compensation. Long waiting for settling into thermal equilibrium means long delay in the process adjustment timings and may lead to process material losses before the correct temperature for the flow has been reached for proper conditions of material therein to be used. The adjustment may be slow.

SUMMARY OF THE INVENTION

The objective is to at least alleviate the problems described hereinabove not satisfactorily solved by the known arrangements, and to provide a feasible refractometer to solve such problems.

The aforesaid objective is achieved by the embodiments of an embodied refractometer and the system/method in accordance with the present embodiments of the invention.

The aforesaid objective(s) are achieved according to the present invention as claimed in an independent claim directed to a refractometer.

Accordingly, in one aspect of the present disclosure of the embodiments of the invention, an embodied refractometer comprises in the refractometer structure a measurement window inside the process liquid flow tube, so providing good exchange rate of the sampled medium to provide representative samples about the process liquid. The embodied structure has laminar flow profile, so avoiding causing stress to the process liquid to change its phases of the constituents and/or composition, by the changes in the flow profile. According to an embodiment of the invention the flow channel has measures to provide a flow essentially at the laminar flow regime.

The process surfaces can be manufactured easily as such from plastics, in an economic and simple process. Such material is also tough and tolerate also vibrations and would not break apart as easily as hard materials would do. According to an embodiment variant, the process surfaces are of plastics, but as a coating of another material such as metal, for example.

In addition, according to an embodiment, in the optical module, the optics is symmetric for the incident and returning rays, so avoiding also angular changes-based mismatches in the optical paths, caused by thermal expansion or shrinkage, originating to potential temperature changes. The prism and further optics can be made solidly attached to the optical module and via it to the chassis, keeping the structure simple and with fewer parts than in traditional devices on the market.

One important feature of the embodied refractometer by the embodied structure is the improved temperature measurement accuracy, as the temperature sensor tip is surrounded by the process liquid, consequently improving the contact area in thermal communication to transfer thermal energy to the surrounding part of the chassis, in which there is the thermometer attached in the flow vessel/flow channel. Such feature also facilitates to provide a thinner wall between the process liquid and thermal sensor operating as the thermometer/a sensor to such.

A refractometer according to the present disclosure of an embodiment of the invention comprises a measurement window, of the optical module, inside a flow channel of the flow vessel of the refractometer, the flow channel being designed to allow flow at least at the measurement window in laminar flow regime of the dedicated process liquid. The measurement window is mounted so that the incident ray(s) of the light beam can reflect from the prims-process liquid interface.

According to the present disclosure of an embodiment of the invention, the embodied refractometer has symmetrical optics in the optical module to compensate thermal expansion and/or shrinkage according to the temperature changes.

According to the present disclosure of an embodiment of the invention the embodied refractometer has such a prism of the refractometer that is attached to the flow vessel region of the chassis at the measurement window area, so that the incident ray(s) of the light beam can reflect from the prims-process liquid interface.

According to the present disclosure of an embodiment of the invention the embodied refractometer has such a chassis that is made of plastics.

According to the present disclosure of an embodiment of the invention the embodied refractometer has such a flow channel that is directed to go straight through the flow vessel.

According to the present disclosure of an embodiment of the invention the embodied refractometer has a tip formation being made of fluoropolymer or polymer comprising at least one of the following: PDVF, PFA, ECTFE, PTFE, PP tai PE.

According to the present disclosure of an embodiment of the invention the embodied refractometer has a tip formation being made of material comprising at least one of the following: ceramics, sapphire, glass, quartz and spinel.

According to the present disclosure of an embodiment of the invention the embodied refractometer has a sensor tip of the optical and/or temperature sensor that are/is surrounded by the measured liquid via the plastic material to which the temperature sensor is attached to.

According to the present disclosure of an embodiment of the invention, the embodied refractometer has the plastic material thickness at the optical and/or temperature sensor location in contact that is thinner than at the elsewhere locations of the flow channel.

According to the present disclosure of an embodiment of the invention, in the embodied refractometer at the optical and/or temperature sensor location, the plastic material thickness is less than 90% of the flow channel wall material thickness elsewhere, optionally less than 80%, optionally less than 70%, optionally less than 60%, optionally less than 50%, optionally less than 30%. According to an embodiment variant, the thickness is over 10% of the flow channel wall material thickness elsewhere.

According to the present disclosure of an embodiment of the invention the embodied refractometer a chassis part forms a protrusion into the process liquid flow guiding flow tube.

According to the present disclosure of an embodiment of the invention the embodied refractometer the temperature sensor is inside said such a protrusion. According to an embodiment variant, the protrusion is same protrusion as the one with the measurement window.

According to the present disclosure of an embodiment of the invention the embodied refractometer has such a chassis part that has a gasket to tighten the chassis part against the process liquid. So, the prism can be separated as well as the optical module from the process liquid elsewhere than at the measurement window.

The utility of the present invention follows from a plurality of factors depending on each embodiment.

The expression "a number of" refers herein to any positive integer starting from one (1), e.g. to one, two, or three.

The expression "a plurality of" refers herein to any positive integer starting from two (2), e.g. to two, three, or four.

The expression "to comprise" has been used as an open expression.

Different embodiments of the present disclosure of invention are disclosed in the dependent claims.

BRIEF DESCRIPTION OF THE RELATED DRAWINGS

Figure 3:
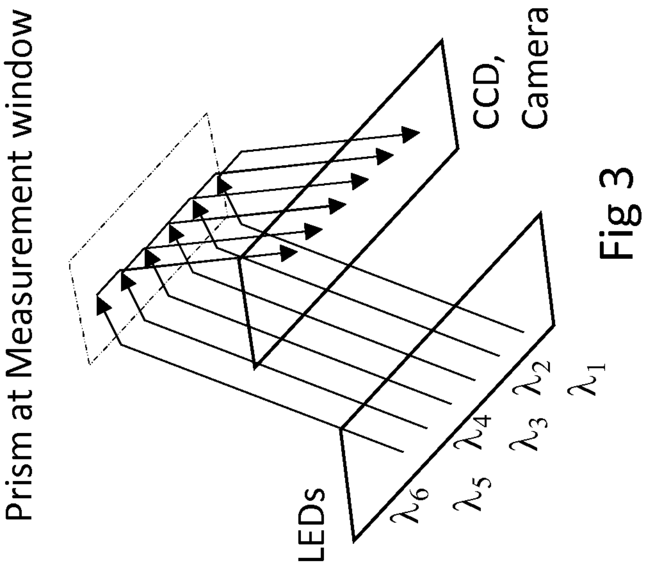
Figure 2:
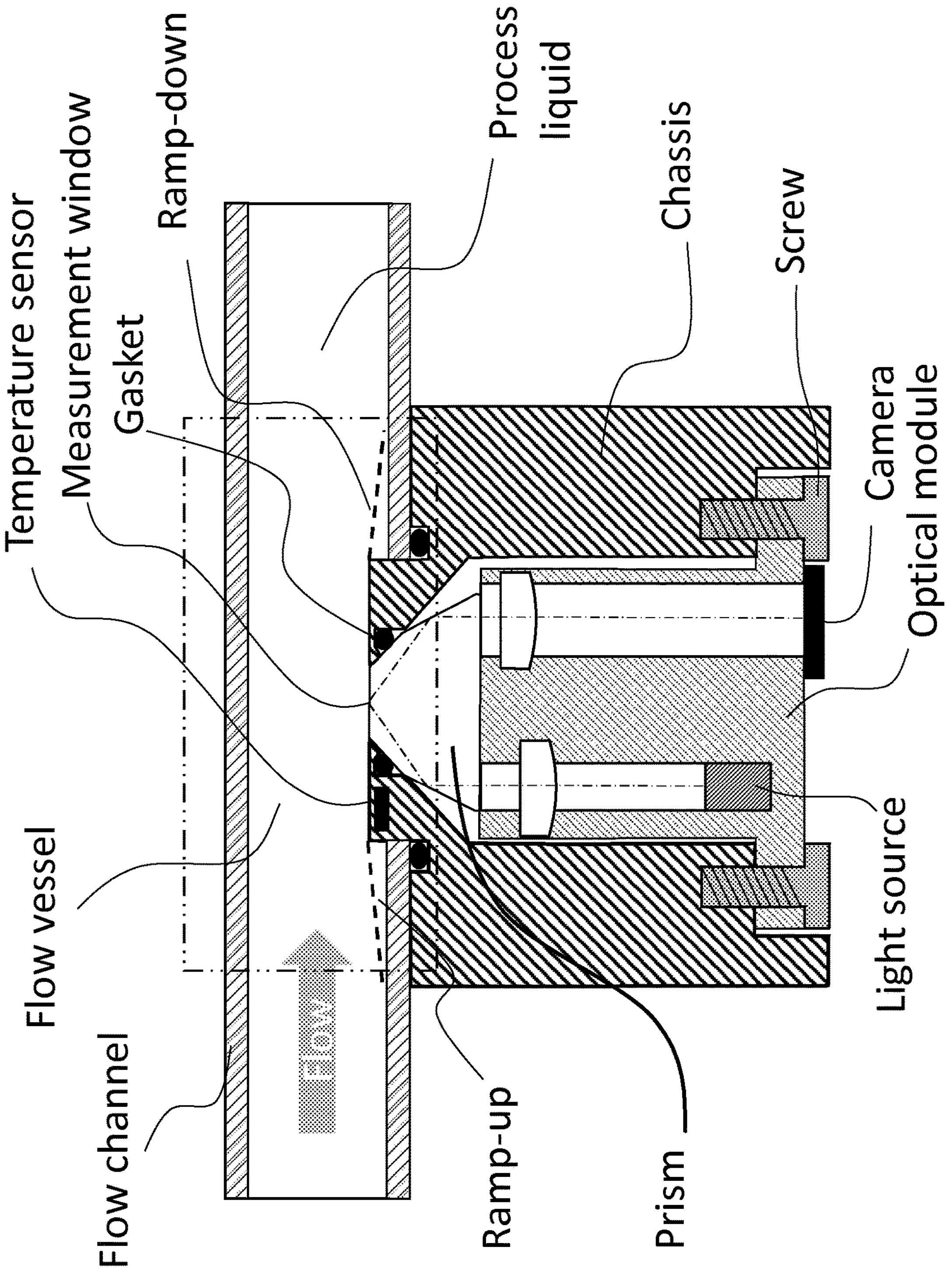

As FIG. 1 has been used to disclose a known solution of a refractometer structure as such, next the disclosure of examples on the embodiments of the invention are described in more detail with reference to the appended drawings in which FIG. 2 illustrates an example about an embodiment of the disclosure of the invention and FIG. 3 illustrates an example of an embodiment variant with multiple light source/polychromatic light source.

DETAILED DESCRIPTION OF THE EMBODIMENTS

FIG. 2 illustrates a refractometer with a refractometer structure to provide a flow channel for a process liquid, to be allowed to flow through the flow channel. The flow channel is considered to go straight through the refractometer's flow vessel, being considered as the volume at the chassis part, so that the ramp up and ramp down areas are included according to an optionality of an embodiment of the disclosure. The Flow vessel can be embodied as a wider part of the flow channel, to be widened smoothly according to the ramp up and ramp down formations, to allow the process liquid flow to adapt to the preserving the flow profile in the laminar flow regime.

Laminar flow occurs at low Reynolds numbers (Re), where viscous forces are dominant, and is characterized by smooth, constant fluid motion.

$$Re = \frac{\rho u L}{\mu} = \frac{uL}{v} \tag{1}$$

Where ρ is the fluid density, u is the flow speed, μ is the dynamic viscosity of the fluid, L is a characteristic dimension of the flow, in practice equals the hydraulic diameter of the flow channel, and v is the kinematic viscosity of the fluid.

According to an embodiment variant, the laminar flow is considered to occur when the Re<1000. According to an optional embodiment variant, the flow is considered laminar when Re<500. According to an optional embodiment variant, the flow is considered laminar when Re<200. According to an optional embodiment variant, the flow is considered laminar when Re<100. According to an optional embodiment variant, the flow is considered laminar when Re<50. According to an optional embodiment variant, the flow is considered laminar when Re<10.

According to an embodiment of the present disclosure, with reference to FIG. 2, the optical module has been built symmetric, so to avoid geometric changes of the route of the primary ray (left hand side in the optical module) from the light source to prism, as well as from the prism to the camera (right hand side in the optical module), which may be originating to temperature changes. The light source can be embodied as an ensemble of LEDs (Light Emitting Diode) comprising at least one LED. The camera can be embodied as CCD-camera or as another suitable camera type for the refractometer use.

At the flow vessel area (in FIG. 2 indicated by dashed line rectangle), there has been indicated as an optional embodiment by the dashed lines ramp-up and ramp-down, so to provide settling time for the fluid to adapt to the flow at the measurement window region. Such an embodiment would allow use with some thixotropic properties comprising fluids, as the geometric change is not sudden, as it would be even with shallow protrusion from the flow channel bottom in corresponding embodiments with shallow but sharp edge. Such protruding can be used also to make sure that the temperature sensor has good thermal contact to the flow of the process liquid, via the wall at the mounting location, where the material thickness can be thinner than elsewhere of the flow channel wall. The prism is arranged in contact with the process fluid at the measurement window, and there is a gasket being used to seal the between-interface of the prism and the chassis tightly and so prevent leakage from the flow channel at the flow vessel region to the optical module, or its surfaces intermediately between the chassis parts and the optical module.

The temperature sensor, a thermometer, has been mounted according to an embodiment into the same protrusion, but different location as the prism. According to an embodiment variant, the temperature sensor can be embodied into the ramp up and/or ramp down region in such embodiments where such are in use. The mounting being made for the temperature sensor under the flow channel surfaces.

According to an embodiment variant the light source is a dot or spot-type light source, to provide a narrow beam, being considered as in practice one dimensional ray.

According to an embodiment variant with reference to the FIG. 3, the light source can be optionally a line source to provide a series of beams and/or a continuum of such narrow beams side by side in rectangular direction in respect of the flow. For graphics clarity reasons, only light rays with respective wave lengths $\lambda_1$ to $\lambda_6$ are illustrated from the light source LEDs to the CCD Camera via the Prism's surface at the measurement window.

According to such a variant, the camera can be selected accordingly with a matrix of pixels in two dimensions, as well as the prism embodied wide correspondingly in suitable dimensions. In such embodiment the same location cross section can so provide instant information from different parts of the flow, and consequently provide a better statistical basis than a dot like ray of monochromatic light.

According to an embodiment variant the line source of light can be implemented by a polychromatic light source (LEDs, FIG. 3), so providing the measurement simultaneously with an ensemble of the wavelengths $\lambda_i$, i€{1, 2, 3, 4, 5, 6}, as there were simultaneously several monochromatic refractometers in parallel using same wide prism via whose measurements window the light beams a directed to the camera. In such an embodiment variant, in addition, a temperature sensor can be embodied in used to provide temperature values, although the temperature could be computed from the information of the several light beams in case of light beams with different wave lengths of the emitted radiation.

According to an embodiment an embodied refractometer comprises a measurement window inside a flow channel at the flow channel wall of the flow vessel region of the refractometer, the flow channel being designed to allow flow at least at the measurement window to occur in laminar flow regime of the dedicated process liquid. The optical module of the refractometer in FIG. 2 has been fastened to the chassis by two similar screws, into a structure of refractometer with symmetrical optics to compensate thermal expansion and/or shrinkage according to the temperature changes.

The prism of the refractometer is embodied as attached to the flow vessel wall at the measurement window area, according to FIG. 2. The prism can be also a wide prism according to an embodiment variant disclosed in FIG. 3, so as in direction protruding out of the plane of the page in FIG. 2. Such an embodiment can be used in such process liquid feeding flows, that are wide, and geometrical changes of the flow geometry are not wanted to produce re-settling of the flow profile at the refractometer location.

According to an embodiment the whole refractometer has been made of plastics, however, excluding the optical elements and semi-conductors in light source and camera, as well as fastening members like screws, for instance, in suitable part. According to an embodiment the refractometer comprises the light source and camera as well as prism in the optical module of the refractometer. According to an embodiment the refractometer comprises also the flow vessel, facilitating the process liquid flow to flow over the measurement window of the prism. Although disclosed in the example as "over" the expression is not limiting only to the exemplified position but can be used also in other positions.

In order to minimize the disturbances to the flow profile and consequential internal stress formation in the process liquid, the flow channel is formed to direct the process fluid flow straight through the flow vessel region.

According to an embodiment, the refractometer has a tip formation at the protruding region in the flow vessel region, the tip also being made of fluoropolymer or polymer comprising at least one of the following: PDVF, PFA, ECTFE, PTFE, PP tai PE.

According to an optional embodiment the refractometer can have a tip formation being made of material comprising at least one of the following: ceramics, sapphire, glass, quartz and spinel.

The protruding region in the flow vessel region can have mounted the sensor tip of the optical and/or temperature sensor, being surrounded by the measured liquid via the plastic material to which the temperature sensor is attached to. According to an optional embodiment, the refractometer can have formations ramp up and ramp down, which are named only such because of the page position, but without any intention to limit the actual position of the refractometer in other positions also, the ramp up is indicative of the direction towards the opposite side of the flow channel, as to be understood in other operational positions, i.e. as if connected to a flow upside-down in respect of the page drawing position.

According to an embodiment the edge is sharp for the protrusion at the flow vessel region, but shallow. According to an embodiment shallow means in the protruding direction maximum protrusion of less than 10%, optionally less than 5%, and even further optionally less than 3% but over 0.5% as counted from the channel open measure at the measurement window location.

According to an embodiment the ramp up and ramp down can be equally erected, so that for example the ramp up can have elevation according to 0.51% elevation. According to an embodiment variant, the ramp down is embodied with symmetrically, but downward direction, i.e. towards the opposite side as the ramp up side.

According to an embodiment the plastic material thickness at the optical and/or temperature sensor location in contact is thinner than at the elsewhere locations of the flow channel. According to an embodiment variant, the plastic material thickness at the optical and/or temperature sensor location is less than 90% of the flow channel thickness elsewhere, optionally less than 80%, optionally less than 70%, optionally less than 60%, optionally less than 50%, optionally less than 30%, but in any said option over 10% of the flow channel thickness elsewhere. The elsewhere can be considered as at the flow channel wall at the flow vessel region or, before the ramp up in an embodiment variant.

According to an embodiment the part in which the optical module is attached to is such a chassis part that forms a protrusion into the process liquid flow guiding flow tube. Accordingly, the temperature sensor can be located inside said such a protrusion. To keep the refractometer structure except the prism at the measurement window, separated from the process flow chemicals, a chassis part has at a suitable location and form a gasket to tighten the chassis part against the process liquid.

Consequently, a skilled person may on the basis of this disclosure and general knowledge apply the provided teachings in order to implement the scope of the present invention as defined by the appended claims in each particular use case with necessary modifications, deletions, and additions.

The invention claimed is:

1. A refractometer comprising:

a continuous flow channel configured to allow flow in a laminar-flow regime of a dedicated process liquid flowing through the continuous flow channel;

a flow vessel region of an interior of the continuous flow channel;

a prism configured to be disposed in contact with the dedicated process fluid, a surface of the prism defining a measurement window disposed in a wall of the continuous flow channel at the flow vessel region of the refractometer such that at least a portion of the measurement window defines a boundary of the continuous flow channel, the flow channel being configured to allow the dedicated process liquid to flow through the flow channel at least at the measurement window; and a light source configured to generate one or more light rays, wherein the light source and the prism are positioned so that the one or more light rays are incident on, and reflect off of, an interface between the prism and the dedicated process liquid in a laminar flow in the continuous flow channel as one or more reflected light rays, and so that the one or more reflected light rays travel outside of the continuous flow channel.

2. The refractometer of claim 1, wherein the refractometer has symmetrical optics to compensate for thermal expansion and/or shrinkage according to temperature changes.

3. The refractometer of claim 1, wherein the prism of the refractometer is attached to a chassis of the flow vessel at the measurement window.

4. The refractometer of claim 3, wherein a chassis of the flow vessel comprises plastic.

5. The refractometer according to claim 1, wherein the flow channel is directed to go straight through the flow vessel.

6. The refractometer according to claim 1, wherein the refractometer has a tip formation comprising fluoropolymer comprising at least one of the following: PDVF, PFA, ECTFE, PTFE, PP, and PE.

7. The refractometer according to claim 1, wherein the refractometer has a tip formation comprising at least one of the following: ceramics, sapphire, glass, quartz and spinel.

8. The refractometer according to claim 4, further comprising a temperature sensor in the plastic chassis of the refractometer, wherein a respective sensor tip of one or more of an optical sensor and the temperature sensor is configured to take measurements of the dedicated process liquid via the plastic material to which the temperature sensor is attached.

9. The refractometer according to claim 8, wherein a thickness of a portion of the plastic material separating one or more of the optical sensor and the temperature sensor from the dedicated process liquid is less than a thickness of the wall at other locations of the continuous flow channel.

10. The refractometer according to claim 9, wherein the thickness of the portion of the plastic material separating one or more of the optical sensor and the temperature sensor from the dedicated process liquid is less than 90% of the thickness of the wall at other locations of the continuous flow channel.

11. The refractometer according to claim 9, wherein the thickness of the portion of the plastic material separating one or more of the optical sensor and the temperature sensor from the dedicated process liquid is over 10% of the thickness of the wall at other locations of the continuous flow channel.

12. The refractometer according to claim 4, wherein a part of the chassis forms a protrusion into the continuous flow channel.

13. The refractometer according to claim 12, further comprising a temperature sensor arranged inside said protrusion.

14. The refractometer according to claim 1, further comprising a chassis part that has a gasket to tighten the chassis part against the dedicated process liquid.

15. The refractometer of claim 10, wherein the thickness of the portion of the plastic material separating one or more of the optical sensor and the temperature sensor from the dedicated process liquid is less than 80% of the thickness of the wall at other locations of the continuous flow channel.

16. The refractometer of claim 10, wherein the thickness of the portion of the plastic material separating one or more of the optical sensor and the temperature sensor from the dedicated process liquid is less than 70% of the thickness of the wall at other locations of the continuous flow channel.

17. The refractometer of claim 10, wherein the thickness of the portion of the plastic material separating one or more of the optical sensor and the temperature sensor from the dedicated process liquid is less than 60% of the thickness of the wall at other locations of the continuous flow channel.

18. The refractometer of claim 10, wherein the thickness of the portion of the plastic material separating one or more of the optical sensor and the temperature sensor from the dedicated process liquid is less than 50% of the thickness of the wall at other locations of the continuous flow channel.

19. The refractometer of claim 10, wherein the thickness of the portion of the plastic material separating one or more of the optical sensor and the temperature sensor from the dedicated process liquid is less than 30% of the thickness of the wall at other locations of the continuous flow channel.

20. The refractometer of claim 2, wherein the prism of the refractometer is attached to the flow vessel chassis at the measurement window.

* * * * *